United States Patent [19]

Gray et al.

[11] Patent Number: 5,641,596
[45] Date of Patent: Jun. 24, 1997

[54] ADJUSTING FILM GRAIN PROPERTIES IN DIGITAL IMAGES

[75] Inventors: Robert T. Gray; David R. Cok, both of Rochester, N.Y.

[73] Assignee: Eastman Kodak Company, Rochester, N.Y.

[21] Appl. No.: 567,793

[22] Filed: Dec. 5, 1995

[51] Int. Cl.$^6$ .................................................. G03C 11/00
[52] U.S. Cl. .......................... 430/21; 382/254; 382/275; 382/276; 364/525
[58] Field of Search .................. 430/21; 382/254, 382/275, 276; 364/525, 574

[56] References Cited

U.S. PATENT DOCUMENTS

| | | | |
|---|---|---|---|
| 4,977,521 | 12/1990 | Kaplan | 364/525 |
| 5,065,256 | 11/1991 | Suganuma et al. | 358/455 |
| 5,091,972 | 2/1992 | Kwon et al. | 382/54 |
| 5,134,573 | 7/1992 | Goodwin | 364/525 |
| 5,335,013 | 8/1994 | Faber | 348/104 |
| 5,475,425 | 12/1995 | Przyborski et al. | 348/239 |

OTHER PUBLICATIONS

"Digital Image Smoothing and the Sigma Filter", by Jong-Sen Lee, Computer Vision, Graphics, and Image Processing, 24, pp. 255–269 (1983).

"Speckle Analysis and Smoothing of Synthetic Aperture Radar Images", by Jong-Sen Lee, Computer Graphics and Image Processing, 17, pp. 24–32 (1981).

Primary Examiner—John A. McPherson
Attorney, Agent, or Firm—Gordon M. Stewart

[57] ABSTRACT

A method is disclosed of operating on a stored digital image produced by scanning the photographic element to smooth film-grain noise. The method includes extracting and storing a set of statistics of the grain pattern of the film type carrying the image, such statistics being representative of local, spatial, and spectral properties of a photographic grain pattern of that type of film; and using the stored set of statistics to operate upon the stored digital image to change such stored digital image so as to smooth film-grain noise when an image is produced.

16 Claims, 3 Drawing Sheets

ADJUSTING FILM GRAIN PROPERTIES IN DIGITAL IMAGES

FIELD OF INVENTION

The present invention relates to a method of operating upon a stored digital image using a set of statistics representative of a film grain type.

BACKGROUND OF THE INVENTION

As set forth in commonly assigned U.S. Pat. No. 5,091,972 to Kwon and Kaplan, a method is described wherein a generalized set of statistics is used to operate upon a digital image to remove film grain noise from scanned digital images. Although effective, a problem with this process is that it is not entirely satisfactory in certain situations, since it requires predetermined noise information and it is difficult to use this process to correct for a whole range of digital images taken from different film types. This is a problem because, in fact, photographic film grain statistics vary with brightness levels, film type, and scanner condition.

By comparison, complete film scanner digital processing film writer combinations are available (e.g. the Eastman Kodak Cineon set of components for motion picture film processing) whereby the film type and scanner used to produce digital images are well known at the time of digital processing.

DETAILED DESCRIPTION OF THE INVENTION

The present invention relates to a method for making optimal use of knowledge of film type and scanner condition for the modification of digital images which are film based (as sources and/or outputs).

SUMMARY OF THE INVENTION

It is an object of the present invention to take into consideration actual grain patterns of different types of photographic films to correct digital images.

It is a further object of the invention to correct for variation of grain as a function of brightness levels in digital images.

These objects are achieved in a method of operating on a stored digital image produced by scanning the photographic element to smooth film-grain noise, comprising the steps of:

a) extracting and storing a set of statistics of the grain pattern of the film type carrying the image, such statistics being representative of local, spatial, and spectral properties of a photographic grain pattern of that type of film and for a condition of a scanner used with that type of film; and b) using the stored set of statistics to operate upon the stored digital image to change such stored digital image so as to smooth film-grain noise when an image is produced.

Advantages

Advantages of the present invention are the ability to measure, record, and exploit for image processing the statistics of photographic film-grain noise specific to a particular combination of photographic film type, photographic development processing, and digital film scanner. Example applications suitable for use by the present invention are the digital removal of the appearance of "graininess" due to photographic film grain by a noise-cleaning processes, and the creation of a desired appearance of "graininess" by a noise synthesis processes.

Another advantage of the present invention further include adaptive smoothing of digital images to remove the effects of film grain noise (e.g. a signal-adaptive implementation of the "sigma" filter), and the creation of synthetic grain in a digital image to simulate the "look" of a particular film type.

DETAILED DESCRIPTION OF THE PREFERRED EMBODIMENTS

Figure 1:
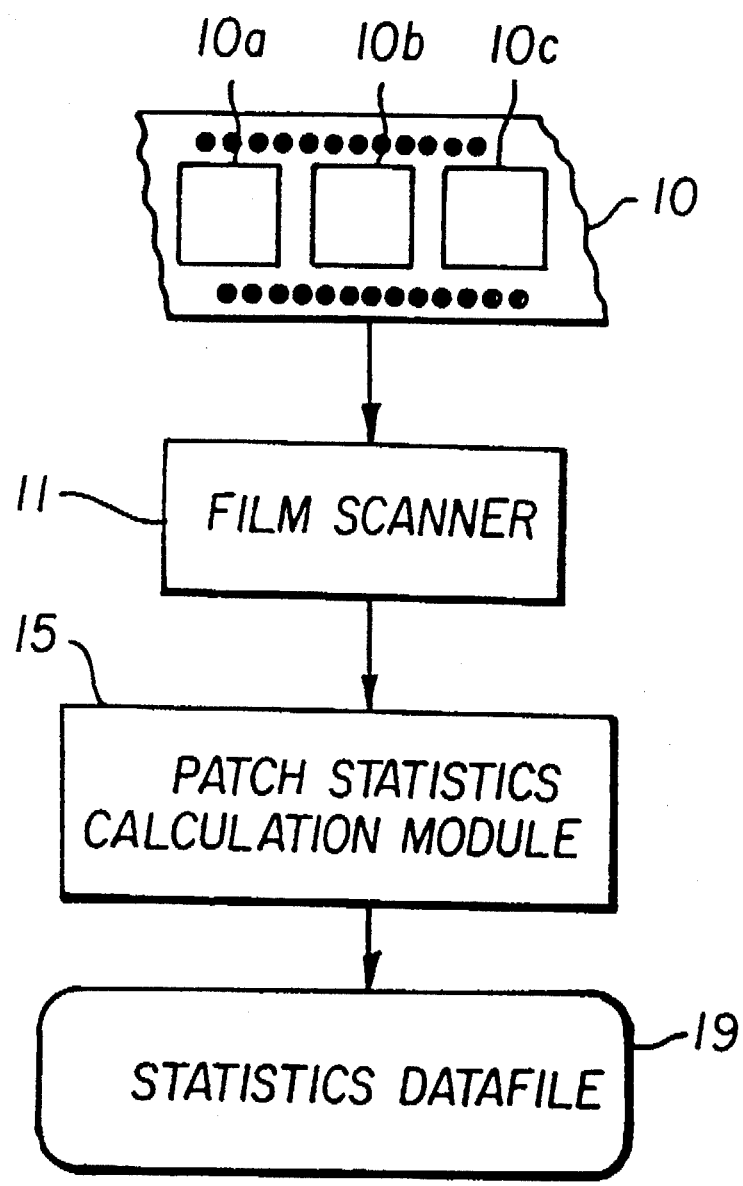
FIG. 1 is a schematic of devices needed to extract and store a set of statistics of a grain pattern for a particular type of film.

This invention involves the creation of a stored set of photographic film statistics (one or more per film type and scanner configuration) which describe the film grain properties of that film as a function of exposed density or exposure, and specific to a particular digitization condition for the film. The statistics include (at minimum) a set of the density or exposure standard deviation or variance per red, green, and blue color record as a function of average local density or exposure. The statistics may also include one or more of the following additional statistics: spatial horizontal correlation coefficients or covariances at sampling lags of one or more pixels; spatial vertical correlation coefficients or covariances at sampling lags of one or more lines; and spectral correlation coefficients or covariances between the three color channels for spatially corresponding samples (i.e. spatial lag zero), all at a series of local average densities or exposures which span the available range of digitized density or exposure levels.

The statistics are preferably created as follows: a series of constant-exposure regions or patches are exposed on samples of the desired film type. The film containing these flat patches is developed in a manner normal to the expected use of the film type, and then digitally scanned using scan parameters (most importantly scanning aperture and pitch) typical of the expected use of the film. Approximately central regions of a digital image of each patch are then selected, either by an operator using a display of the digitized patches, or automatically using either existing knowledge of the patch boundaries or by automatic search for patch boundaries. Within each patch, the average density or exposure and the density or exposure standard deviation or variance statistic per color channel are calculated. In addition, one or more of the correlation or covariance statistics described above may be calculated for each patch. These exposure or density values and corresponding statistics per patch are then stored in a digital file which is accessible by suitably written software or hardware image processing applications. Alternately, a parametric equation predicting each statistic may be fitted as a function of average color channel density and exposure, and the coefficients of the equations stored in a digital file accessible by suitably written software or hardware image processing applications. An example of a cubic polynomial equation follows. Coefficients can be stored in a data file.

$$\sigma_{CH} = a_1 + a_2 C_{CH} + a_3 C^2_{CH} + a_4 C^3_{CH}$$

where σ is the standard deviation, $a_1$ are constants, and $C_{CH}$ is the original digital count value for channel "CH".

Appendix A sets forth data that can be stored in a digital file resulting from the process in accordance with this invention. These data can be processed as will be discussed with reference to FIG. 2 and FIG. 3. In the example, sufficient information is given to define the film type, film processing, scanner condition, and post scanner processing in the first two lines. Subsequently, a set of data then defines the standard deviation due to film grain in digital counts (typically proportional to developed film density) resulting for each color channel for several original digital count values of grain-free signal; these original count values approximately span the possible dynamic range of the digital image (which in the example is 0–1023 counts). A second set of data specifies the correlation coefficients between the color channels for a number of original (here listed as "mean") digital count values, defined in the example as triplets of red, green, and blue original count values for a specified correlation coefficient. Finally, spatial correlation coefficients at lags of one and two pixels in the horizontal and vertical image directions are specified for the same mean color triplet values used for the interchannel correlation coefficients.

Turning first to FIG. 1, where there is shown a patch target developed film 10 having patch targets 10a, 10b, and 10c. By patch target it is meant a set of photographic patches in which the patches include uniform exposure in which the series of patches 10a, 10b, 10c. . . each constitute a region of constant exposure. Typically, there will be 20 or more of such series of patches which scale the available exposure dynamic range of the film element.

A film scanner 11 is adapted to scan each of these patches and produces digital images representative of each patch which are stored. The film scanner is typically a color film scanner which will produce for each patch a plurality of color images, say, for example, red, green, and blue for each patch in the series. Block 15 includes a digital image processor including one or more digital images well understood to those skilled in the art. This digital image processor operates upon each colored digital image for each patch to extract per patch the average digital count value plus the average standard deviation or variance over all of the pixels in the patch per color. The count value is calculated as follows: for each digital image the digital density of each pixel is added and that sum is divided by the number of digital pixels to provide a count value. This could also be referred to as the mean count patch value. The standard deviation of the count values are also calculated in a well known manner. Alternately, the variance is calculated for each color digital image. For providing film grain into a digital image, a series of spatial correlation coefficients for each color for a given number of lag pixels separation are calculated. More specifically, there will be a predetermined separation or lag, say, for example, one pixel between each of the series and these coefficients are calculated, then the lag is changed to say, for example, two pixels between series. These coefficients are calculated both vertically and horizontally and at lags 1 and 2 preferably. The calculation of spatial correlation coefficients is, of course, well known, but it has not been used in the same way as the present invention. The combination of the standard deviation and the correlation coefficients capture the local, spatial, and spectral properties of a photographic film grain pattern of the type of film of interest.

After the patch statistics are produced in block 15, they are stored in a statistics data file 19. An example of a statistics file is set forth in Appendix A.

The mean count value for color channel "x" or patch "p" is provided by the following equation $$\overline{x}_p = n_p^{-1} \cdot \sum_{i,j \in p} x_{i,j}$$

where $x_{i,j}$ is a count value in the "x" color channel located at image coordinates (i,j), and the summation is over all such pixels located in patch "p", which contains np such pixels.

The variance $\sigma^2$ for color channel "x" of patch "p" is given by $$\sigma_{x,p}^2 = n_p^{-1} \cdot \sum_{i,j \in p} (x_{i,j} - \overline{x}_p)^2$$

where the summation is again over all pixels having spatial coordinates i,j contained in patch p. The standard deviation $\sigma_{x,p}$ of channel x of patch p is given by the square root of the above variance $\sigma_{x,p}^2$. (If the variance is zero, then the corresponding standard deviation is also set to zero).

Spatial correlation coefficient of horizontal lag one pixel for color channel "x" of patch "p" is given by $$\rho_{x,p,H1} = \frac{n_p^{-1} \cdot \sum_{i,j,i+1 \in p} [(x_{i,j} - \overline{x}_p) \cdot (x_{i+1,j} - \overline{x}_p)]}{\sigma_{x,p}^2}$$

where the summation is over all locations i,j where i,j and i+1 are simultaneously contained within patch p.

Spatial correlation coefficient of vertical lag one line for color channel "x" of patch "p" is given by $$\rho_{x,p,V1} = \frac{n_p^{-1} \cdot \sum_{i,j,i+1 \in p} [(x_{i,j} - \overline{x}_p) \cdot (x_{i,j+1} - \overline{x}_p)]}{\sigma_{x,p}^2}$$

where the summation is over all locations i,j where i,j and j+1 are simultaneously contained within patch p.

Thus, in general, the spatial correlation coefficient for channel x over patch p for horizontal lag k and vertical lag m is given by $$\rho_{x,p,Hk,Vm} = \frac{n_p^{-1} \cdot \sum_{i,j,i+k,j+m \in p} [(x_{i,j} - \overline{x}_p) \cdot (x_{i+k,j+m} - \overline{x}_p)]}{\sigma_{x,p}^2}$$

Variations of the above definitions for correlation coefficients, such as to account for slight differences in the effective count means and standard deviations which occur over positions (i,j) versus (i+k,j+m), are also usable and generally result in only minor changes in the resulting numerical values for patch sizes on the order of 100×100 samples or greater. These are recognized in standard texts as alternate valid estimators of the same statistic.

As now should be clear to those skilled in the art, other statistics can also be used in accordance with this invention which would include, for example, between color correlation coefficients, specially between red and green and green and blue color balance. This is set forth in the following equation where the spectral correlation coefficient between color channels x and y over patch p is given by $$p_{x,y,p} = \frac{n_p^{-1} \cdot \sum_{i,j \in p} [(x_{i,j} - \overline{x_p}) \cdot (y_{i,j} - \overline{y_p})]}{\sigma_{x,p} \cdot \sigma_{y,p}}$$

where $\sigma_{x,p}$ and $\sigma_{y,p}$ are the count standard deviations for color channels x and y respectively over the same patch p.

After the appropriate coefficients and statistics are calculated they are, of course, stored in an appropriate stored data file 19 in memory which is indexed according to the film type and the particular scanner characteristics so that it can be accessed for use as will later be described as in FIGS. 2 and 3. The scanner characteristic generally of interest is spatial resolution, that is, the number of pixels per fine for a given scanner which also correlates to the size of a pixel which will finally be produced on a film.

Figure 2:
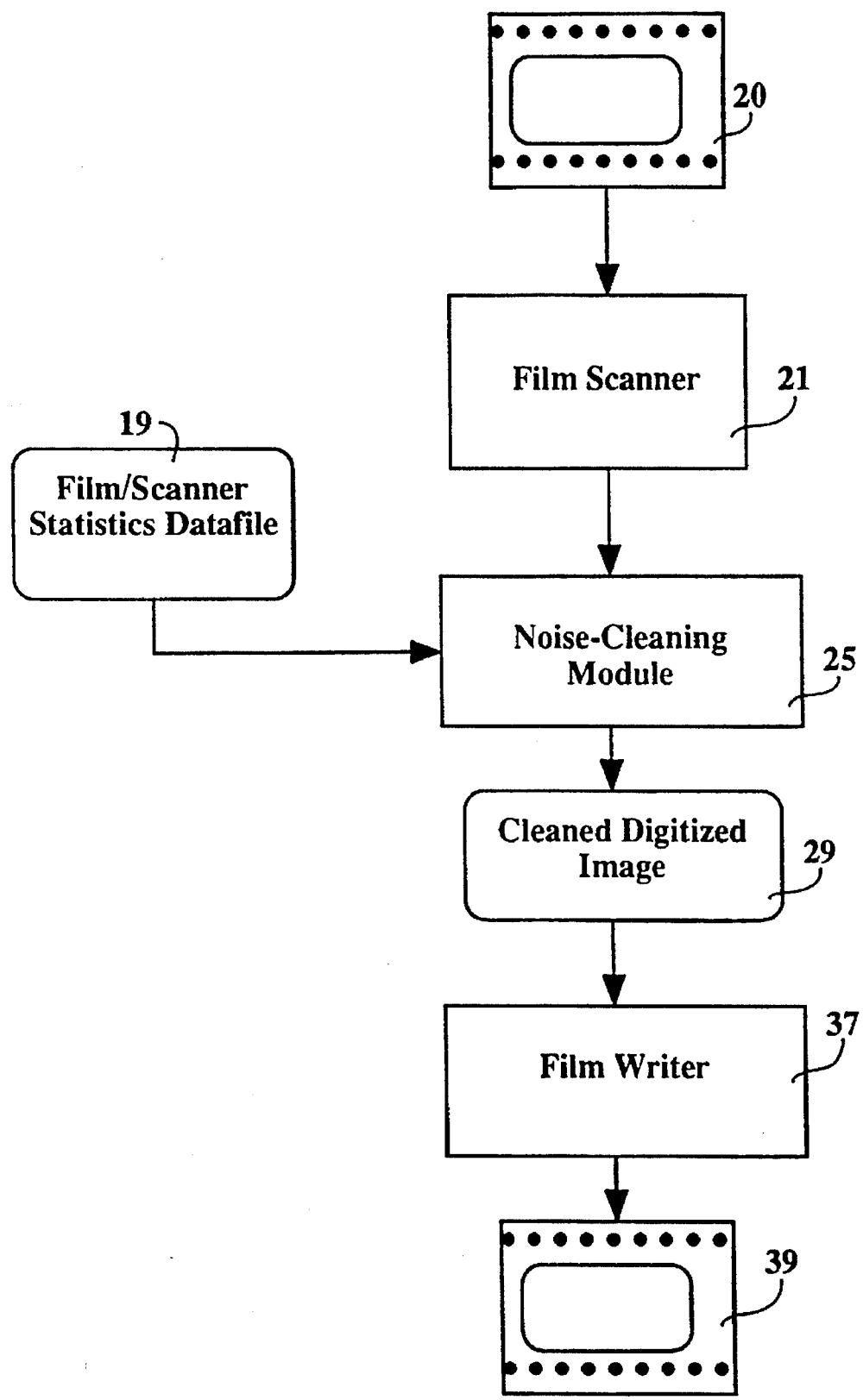
FIG. 2 shows a series of devices which use the extracted information as shown in FIG. 1 to smooth or clear film grain noise.

Turning now to FIG. 2 where the statistics in the stored data file 19 are usable for cleaning or smoothing digital images. As shown in FIG. 2, there is a film element 20 of a specific film type, which film type and scanner type are used to select the appropriate data file 19. A film scanner 21 scans the image in the film element 20 and digitizes such image. The stored digital image and the stored data file 19 are applied to a noise-cleaning module 25. Noise-cleaning is well understood to those skilled in the art and a representative type of noise-cleaning system is shown in the previously referred to U.S. Pat. No. 5,091,972 to Kwon and Kaplan. In accordance with the present invention, for each local region a plurality of local pixels in the digital image, the corresponding mean color digital count value is calculated. A corresponding mean digital count value per color is then found in the associated data file 19. The standard deviation in the stored data file 19 corresponding to the mean digital count value is then extracted from the data file 19 and incorporated in the noise-cleaning module 25 to estimate the noise. These two statistics are also used in the Kaplan patent to provide for noise-cleaning or smoothing and reference should be made to that patent. The clean digital image is stored in memory block 29. The output of the cleaned digital image 29 is applied to a conventional film writer 37 which as its output exposes a film element 39.

The standard deviation statistic is also used in the Kwon and Kaplan patent to provide for noise-cleaning or smoothing and reference should be made to that patent. The inclusion of a table of standard deviations per mean color-channel count value allows for an implementation of the above-described noise-cleaning algorithm of Kwon and Kaplan which explicitly adapts the amount of noise cleaning as a function of the changing amount of film-grain noise with local mean count value.

In addition to which another image noise-cleaning method which may be adapted to directly make use of the grain statistics table is the method described in "Digital Image Smoothing and the Sigma Filter", by Jong-Sen Lee, Computer Vision, Graphics, and Image Processing, 24, p. 255-269(1983). In this technique, called the sigma filter, a sliding rectangular window is passed across the digital image to be cleaned. The histogram of the digital counts within the window is computed at each window location, and the location of the count corresponding to the pixel at the center of the window is located in the histogram. Then the histogram of window counts to each side in the histogram of the count for the window-center pixel are averaged (generally including the histogram value for the window-center count) out to a distance in counts which is a predetermined multiple of the expected standard deviation of the image noise. This average is then used to replace the digital count value at the center of the window, thus providing noise smoothing while tending to preserve sharp spatial edges in the image. Such an algorithm can be modified in a straightforward manner to also estimate a local "typical" count value at each window location (most obviously the actual input count at the center of each window, or alternately the average count value within each window). This could then easily be used at each window location to access the grain statistics table (either directly, or indirectly via preloading the grain statistics table into a look-up table in device memory) to extract the expected noise standard deviation (alternately, the expected noise variance) to provide a signal-adaptive variant of the sigma filter.

It should be noted that this is different than the method cited in the above reference by Lee to a signal-adaptive version in "Speckle Analysis and Smoothing of Synthetic Aperture Radar Images", by Jong-Sen Lee, Computer Graphics and Image Processing, 17, pp. 24–32(1981). This second reference is to a method of estimating local noise in certain circumstances while simultaneously performing digital noise-cleaning, and is subject to estimation error since the noise is generally confused with the desired signal.

Figure 3:
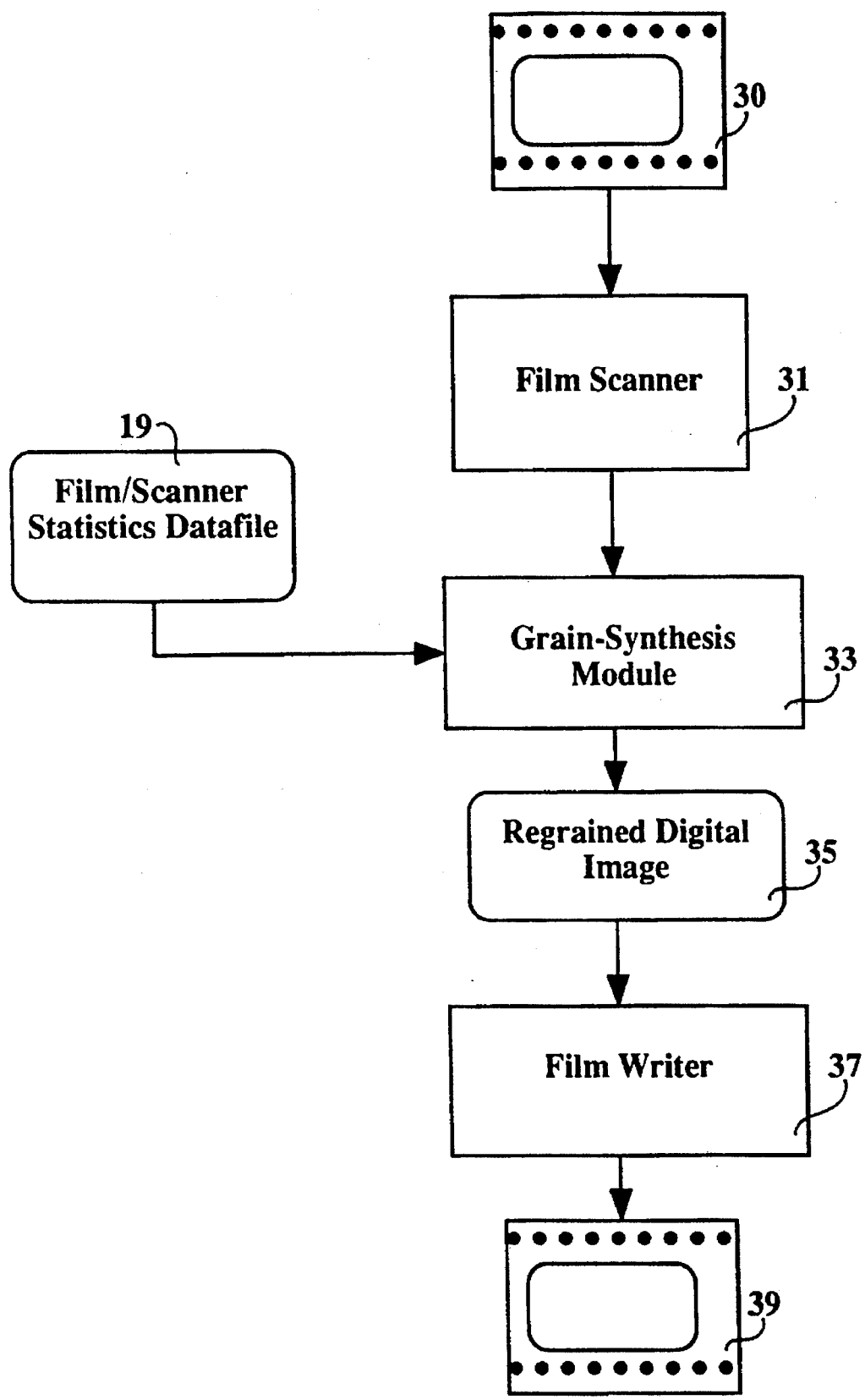
FIG. 3 shows a system of devices for synthesizing film grain in a digital image.

Turning now to FIG. 3, where the appropriate data file 19 is used in adding film grain noise to a digital image. It will be understood that although a developed film element 30 is shown in this application, it will be understood that a digital image may be provided by a computer itself or may be provided by a television video signal. In any event, in this embodiment, a developed film element 30 is shown and this element is scanned by a film scanner 31 in a similar fashion to that in FIG. 1 to produce a digital image which is applied into the grain synthesis module 33. In this case, the particular data file 19 is selected on the basis of the output film type of which an image is produced. The output of the grain synthesis module is a digital image which is stored as shown in block 35. It is applied to the film writer 37 which, in turn, produces an output exposed image film dement 39 in a similar manner as described with respect to FIG. 2.

The grain synthesis module 33 operates as follows: The input digital image is assumed to be effectively free of significant film-grain noise. This may be because the image is derived from an essentially noise-free source (e.g. an extremely fine-grain film), or because it has been preprocessed (e.g. by noise-cleaning or by scanning to sufficient low-resolution to remove grain effects). At each pixel location in the input digital image (typically in a raster scan pattern for visiting each pixel location), for each color channel, a noise value is artificially generated by the computation device using a random-number generator which is then spatially filtered and scaled to produce a value similar to that expected of film grain for that type of film, scanner resolution, and color channel which is desired. This synthesized noise "count" value is then added to the "clean" color-channel count value at that location and is written out to secondary storage. The spatial filter employed is typically a recursive (infinite impulse response [IIR]) filter which makes use of synthetic noise values which were generated immediately preceding the current pixel in horizontal and vertical image directions. The coefficients of the filter can be analytically specified to directly use spatial coefficients at small lags in the horizontal and vertical directions which are stored in the grain statistics table of this invention, to produce a new output grain noise value which is consistent in its correlation values with spatially previous values and with the desired correlation values, has zero count mean, and desired count standard deviation.

A variant of this IIR filter approach can also correctly synthesize a film-grain noise pattern which exhibits correlation between color channels (spectral correlation) as well as correlation between noise count values of pixels within the same color channel. This can be a visually significant effect for images derived from photographic film, although of lesser visual effect than that due to within-color-channel spatial correlation.

In accordance with the present invention spatial correlation coefficients of spatial lags of one and two pixels horizontally and vertically, and spectral correlation coefficients between adjacent color channels (that is red-green and green-blue) are sufficient to produce good visual matching of film grains between synthesized and real film images, and, along with the film-grain standard deviations and the mean input count values to which they correspond, constitute the preferred set of statistics to be included in a generally usable film-grain noise statistics table.

In either film-grain noise smoothing or film-grain noise synthesis applications, it is understood that film-grain statistics will in general be required corresponding to every possible combination of color-channel count value. It has been found by experimentation that not all such combinations need be stored in a generally usable film-grain statistics storage table. Specifically, for standard deviation and spatial correlation coefficient statistics, only the mean (or alternately the noise-free) digital count value of the same color-channel need be employed. In addition, although the mean (or alternately the noise-free) digital count values should approximately span the expected range of such values, they need not be explicitly listed for every possible color-channel count value; rather, a sampling equally spaced in mean count value over the range, typically of about twenty values, is sufficient. The application using the statistics will then use some commonly accepted method for interpolating intermediate values and (if necessary) extrapolating extreme values of the statistics. A preferred method due to simplicity with adequate performance is linear interpolation of intermediate values, and replication of end table values to estimate extreme values.

Similarly for spectral correlation coefficients, the preferred implementation only indexes such coefficients by the mean count values averaged over both color-channels associated with the correlation coefficient. This allows for one-dimensional tables rather than two-or three-dimensional tables to be used.

In general, the applications using the grain statistics table will fill an internal set of look-up tables by the described interpolation and extrapolation prior to processing the input image.

A set of local average (or mean) count values per color channel (or for color-averaged brightness in panchromatic imagery) is provided. These mean count values span the expected count values of image pixels; with each local average count value per color channel of noise count standard deviation (or alternately a variance value) is associated noise count spatial correlation value for each of pixel lags of one and two pixels, in horizontal and vertical image directions. Associated with each local average count value per color channel is a noise count spectral correlation coefficient for spatial lag of zero pixels (i.e. same spatial location) and for all spectrally adjacent color channels (e.g. red-green and green-blue). These relations would be defined by the equations given previously, or by commonly accepted similar estimators of same, or by scaled versions of same; all statistics for a specific scanner condition.

A minimally reduced set of grain statistics would include the set of local average (or mean) count values per color channel (or for color-averaged brightness in panchromatic imagery) which spans the expected count values of image pixels; and associated with each local average count value per color channel a noise count standard deviation (or alternately a variance value); all for a specific scanner condition.

In general, the scanner condition used to create the grain statistics table is equivalent to that which will be used in the application to modify the input image. Key scanner conditions are the spatial resolution (horizontally and vertically) of each scanner pixel on the film, the sample spacing (horizontally and vertically) of the scanner on the film, and the spectral response curves of the scanner for each color channel. This scanner condition is in the usual implementation image per film grain statistics table, and may be specified by the model scanner and the resolution setting used.

The invention has been described in detail with particular reference to certain preferred embodiments thereof, but it will be understood that variations and modifications can be effected within the spirit and scope of the invention.

PARTS LIST 10 developed film
10a patch target
10b patch target
10c patch target
11 film scanner
15 block
19 stored data file
20 film element
21 film scanner
25 noise-cleaning module
29 memory block
30 developed film element
31 film scanner
33 grain synthesis module
35 regrained digitized image
37 film writer
39 output exposed film image element

| Appendix A |
| --- |
| (First Set) |
| 4 : Version # |
| Film/Scanner Condition: Film5299Develop04Scan01Resolution1.pat |
| 3 20 :No. color channels, No. of indexing counts |

|  | OrigChan | StdDevChan |
| --- | --- | --- |
| 1 : Channel |  |  |
| 1 | 97.2 | 20.580 |
| 2 | 106.1 | 22.618 |
| 3 | 128.6 | 25.901 |
| 4 | 176.5 | 27.916 |
| 5 | 235.0 | 27.824 |
| 6 | 294.1 | 25.626 |

-continued

Appendix A

| | | |
|---|---|---|
| 7 | 345.7 | 22.314 |
| 8 | 394.9 | 20.458 |
| 9 | 447.4 | 19.368 |
| 10 | 497.8 | 18.601 |
| 11 | 551.4 | 17.121 |
| 12 | 607.1 | 16.384 |
| 13 | 664.5 | 16.857 |
| 14 | 722.1 | 16.336 |
| 15 | 777.3 | 15.655 |
| 16 | 824.9 | 16.437 |
| 17 | 862.7 | 16.301 |
| 18 | 893.2 | 16.527 |
| 19 | 917.8 | 15.883 |
| 20 | 937.4 | 16.290 |

2 : Channel

| | | |
|---|---|---|
| 1 | 100.9 | 18.109 |
| 2 | 107.9 | 18.803 |
| 3 | 122.7 | 19.705 |
| 4 | 158.3 | 20.098 |
| 5 | 212.1 | 17.774 |
| 6 | 267.8 | 14.267 |
| 7 | 320.5 | 12.640 |
| 8 | 374.6 | 12.244 |
| 9 | 432.4 | 12.013 |
| 10 | 488.5 | 11.467 |
| 11 | 545.6 | 11.173 |
| 12 | 603.5 | 10.787 |
| 13 | 658.4 | 10.277 |
| 14 | 711.5 | 10.209 |
| 15 | 764.0 | 10.236 |
| 16 | 810.1 | 10.539 |
| 17 | 854.3 | 11.291 |
| 18 | 893.5 | 11.756 |
| 19 | 928.8 | 11.972 |
| 20 | 958.7 | 12.527 |

3 : Channel

| | | |
|---|---|---|
| 1 | 102.2 | 17.101 |
| 2 | 111.5 | 18.319 |
| 3 | 130.2 | 20.254 |
| 4 | 166.4 | 21.955 |
| 5 | 214.6 | 21.602 |
| 6 | 266.0 | 19.385 |
| 7 | 323.6 | 16.600 |
| 8 | 385.7 | 14.254 |
| 9 | 445.6 | 13.001 |
| 10 | 502.7 | 12.566 |
| 11 | 558.7 | 12.522 |
| 12 | 614.7 | 12.367 |
| 13 | 666.2 | 12.168 |
| 14 | 712.7 | 11.498 |
| 15 | 754.9 | 10.412 |
| 16 | 787.7 | 9.374 |
| 17 | 810.4 | 8.375 |
| 18 | 828.1 | 7.518 |
| 19 | 840.2 | 6.882 |
| 20 | 848.8 | 6.670 |

(Second Set)

| | OrigRed | OrigGrn | OrigBlu | RhoRedGrn | RhoRedBlu | RhoGrnBlu |
|---|---|---|---|---|---|---|
| 1 | 97.2 | 100.9 | 102.2 | 0.4281 | 0.1743 | 0.2374 |
| 2 | 106.1 | 107.9 | 111.5 | 0.4260 | 0.1727 | 0.2237 |
| 3 | 128.6 | 122.7 | 130.2 | 0.4166 | 0.1710 | 0.2086 |
| 4 | 176.5 | 158.3 | 166.4 | 0.3864 | 0.1395 | 0.1445 |
| 5 | 235.0 | 212.1 | 214.6 | 0.3885 | 0.1353 | 0.1789 |
| 6 | 294.1 | 267.8 | 266.0 | 0.4104 | 0.1265 | 0.2254 |
| 7 | 345.7 | 320.5 | 323.6 | 0.4211 | 0.1213 | 0.2044 |
| 8 | 394.9 | 374.6 | 385.7 | 0.4064 | 0.1262 | 0.1610 |
| 9 | 447.4 | 432.4 | 445.6 | 0.3915 | 0.1278 | 0.1277 |
| 10 | 497.8 | 488.5 | 502.7 | 0.3735 | 0.1310 | 0.1142 |
| 11 | 551.4 | 545.6 | 558.7 | 0.3634 | 0.1240 | 0.1308 |
| 12 | 607.1 | 603.5 | 614.7 | 0.3683 | 0.1385 | 0.1781 |
| 13 | 664.5 | 658.4 | 666.2 | 0.3422 | 0.1335 | 0.1627 |
| 14 | 722.1 | 711.5 | 712.7 | 0.3384 | 0.1447 | 0.1812 |
| 15 | 777.3 | 764.0 | 754.9 | 0.3163 | 0.1430 | 0.1935 |
| 16 | 824.9 | 810.1 | 787.7 | 0.3189 | 0.1775 | 0.1940 |

Appendix A -continued

| | | | | | | |
|---|---|---|---|---|---|---|
| 17 | 862.7 | 854.3 | 810.4 | 0.3378 | 0.2578 | 0.3041 |
| 18 | 893.2 | 893.5 | 828.1 | 0.3012 | 0.2427 | 0.2764 |
| 19 | 917.8 | 928.8 | 840.2 | 0.2672 | 0.2125 | 0.2299 |
| 20 | 937.4 | 958.7 | 848.8 | 0.2547 | 0.2295 | 0.2621 |
| | | | (Third Set) | | | |
| BL | RhoRedX | RhoGrnX | RhoBluX | RhoRedY | RhoGrnY | RhoBluY |
| 1 | 0.4519 | 0.4711 | 0.5331 | 0.2699 | 0.4690 | 0.5542 |
| 2 | 0.4571 | 0.4628 | 0.4998 | 0.2670 | 0.4630 | 0.5433 |
| 3 | 0.4496 | 0.4410 | 0.4613 | 0.2798 | 0.4547 | 0.5224 |
| 4 | 0.4450 | 0.4269 | 0.4213 | 0.2663 | 0.4507 | 0.4993 |
| 5 | 0.4101 | 0.4066 | 0.3941 | 0.2338 | 0.4176 | 0.4730 |
| 6 | 0.3839 | 0.3578 | 0.3886 | 0.2051 | 0.3810 | 0.4606 |
| 7 | 0.3797 | 0.3284 | 0.3691 | 0.2351 | 0.3715 | 0.4646 |
| 8 | 0.3800 | 0.3054 | 0.3377 | 0.2138 | 0.3604 | 0.4421 |
| 9 | 0.3521 | 0.2955 | 0.3212 | 0.1845 | 0.3430 | 0.4026 |
| 10 | 0.3318 | 0.3042 | 0.3160 | 0.1607 | 0.3326 | 0.3912 |
| 11 | 0.3592 | 0.2703 | 0.2885 | 0.1915 | 0.3298 | 0.3937 |
| 12 | 0.3647 | 0.2868 | 0.2853 | 0.2143 | 0.3405 | 0.4024 |
| 13 | 0.3385 | 0.2890 | 0.3048 | 0.1626 | 0.3180 | 0.3763 |
| 14 | 0.3552 | 0.2913 | 0.3059 | 0.1764 | 0.3020 | 0.3776 |
| 15 | 0.3595 | 0.2901 | 0.3113 | 0.1884 | 0.2947 | 0.3750 |
| 16 | 0.3501 | 0.3090 | 0.3056 | 0.1515 | 0.2757 | 0.3355 |
| 17 | 0.3908 | 0.3636 | 0.3488 | 0.1579 | 0.2615 | 0.3021 |
| 18 | 0.3730 | 0.3389 | 0.3051 | 0.1646 | 0.2595 | 0.2749 |
| 19 | 0.3491 | 0.3037 | 0.2612 | 0.1479 | 0.2300 | 0.2033 |
| 20 | 0.3266 | 0.3152 | 0.2827 | 0.1285 | 0.2114 | 0.1970 |
| BL | RhoRedX2 | RhoGrnX2 | RhoBluX2 | RhoRedY2 | RhoGrnY2 | RhoBluY2 |
| 1 | 0.0230 | 0.0156 | 0.1053 | −0.1897 | −0.1670 | −0.1163 |
| 2 | 0.0263 | −0.0239 | 0.0247 | −0.2082 | −0.1757 | −0.1262 |
| 3 | −0.0411 | −0.0666 | −0.0888 | −0.2029 | −0.1836 | −0.1467 |
| 4 | −0.1201 | −0.1217 | −0.1892 | −0.2297 | −0.1948 | −0.1867 |
| 5 | −0.1020 | −0.0921 | −0.2344 | −0.2206 | −0.1970 | −0.2051 |
| 6 | −0.1423 | −0.1020 | −0.2319 | −0.2277 | −0.2011 | −0.2080 |
| 7 | −0.1546 | −0.0855 | −0.2188 | −0.2202 | −0.1968 | −0.2023 |
| 8 | −0.0855 | −0.0740 | −0.1530 | −0.2153 | −0.1897 | −0.1905 |
| 9 | −0.1415 | −0.0609 | −0.1423 | −0.2068 | −0.1964 | −0.1966 |
| 10 | −0.0765 | −0.0140 | −0.1299 | −0.2131 | −0.1928 | −0.1844 |
| 11 | −0.0938 | −0.0197 | −0.0855 | −0.2019 | −0.1842 | −0.1818 |
| 12 | −0.1127 | −0.0074 | −0.1151 | −0.1972 | −0.1599 | −0.1674 |
| 13 | −0.0074 | 0.1373 | −0.0214 | −0.1855 | −0.1508 | −0.1668 |
| 14 | 0.0707 | 0.1242 | −0.0008 | −0.1871 | −0.1455 | −0.1556 |
| 15 | −0.0510 | −0.0362 | 0.0263 | −0.1662 | 0.1280 | 0.1420 |
| 16 | 0.0510 | 0.2073 | −0.0197 | −0.1625 | −0.1173 | −0.1183 |
| 17 | 0.3199 | 0.5272 | 0.3841 | −0.1506 | −0.1268 | −0.1004 |
| 18 | 0.1801 | 0.2953 | 0.2615 | −0.1351 | −0.0915 | −0.0558 |
| 19 | 0.0156 | 0.1077 | 0.0822 | −0.1280 | −0.0840 | −0.0576 |
| 20 | −0.2196 | 0.2443 | 0.1801 | −0.1112 | −0.0761 | 0.0053 |

We claim:

1. A method of operating on a stored digital image produced by scanning a photographic element to smooth film-grain noise, comprising the steps of:
   a) extracting and storing a set of statistics representative of local spatial and local spectral properties of a photographic grain pattern of the film carrying the image and for a condition of a scanner used with that film; and
   b) using the stored set of statistics to operate upon the stored digital image to change such stored digital image so as to smooth film-grain noise when an image is produced.

2. The method of claim 1 wherein the set of statistics includes statistics representative of brightness levels potentially in the image.

3. The method of claim 1 further including the step of storing a plurality of sets of statistics corresponding to grain patterns of different films and different scanner conditions and selecting the appropriate set of statistics for the film and scanner condition of the scanned photographic image.

4. A method according to claim 1 wherein the statistics include an average local density for each of a plurality of color channels.

5. A method according to claim 4 wherein the statistics further include a standard deviation or variance as a function of average local density or exposure for each color channel.

6. A method according to claim 1 wherein the statistics include a spatial correlation co-efficient.

7. A method according to claim 1 the statistics include a color correlation co-efficient.

8. A method of reducing the effects of film grain noise from a scanned photographic film image, comprising the steps of:
   a) scanning the film image to produce a digital image;
   b) extracting and storing a set of statistics representative of local spatial and local spectral properties of a photographic grain pattern of the film carrying the image for a scanner condition; and
   c) reducing the effects of film grain noise in such scanned image by using such stored statistics.

9. The method of claim 8 wherein the set of statistics includes statistics representative of brightness levels potentially in the image.

10. A method of simulating the effects of film grain noise in a digital image, comprising the steps of:

a) extracting and storing a set of statistics representative of local spatial and local spectral properties of a photographic grain pattern of the film as scanned using a specified set of scanner conditions; and b) simulating the effects of film grain noise in such digital image by using such stored statistics whereby such simulated film grain noise digital image is adapted for use in producing an image with film grain noise.

11. The method of claim 10 further including the step of storing a plurality of sets of statistics corresponding to desired grain patterns of different films and scanner conditions and selecting the appropriate set of statistics for a particular film type and scanner conditions to simulate the grain pattern of such film type.

12. The method of claim 10 wherein the set of statistics includes statistics representative of brightness levels potentially in the image.

13. A method according to claim 10 wherein the statistics include an average local density for each of a plurality of color channels.

14. A method according to claim 13 wherein the statistics further include a standard deviation or variance as a function of average local density or exposure for each color channel.

15. A method according to claim 10 wherein the statistics include a spatial correlation co-efficient.

16. A method according to claim 10 the statistics include a color correlation co-efficient.

* * * * *